(12) United States Patent
Hillier et al.

(10) Patent No.: US 8,675,836 B2
(45) Date of Patent: Mar. 18, 2014

(54) SYSTEM FOR ESTABLISHING PUBLICLY ACCESSIBLE TELEPHONE NUMBERS AND METHODS THEREOF

(75) Inventors: Peter Matthew Hillier, Ottawa (CA); Katayoun Hillier, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 398 days.

(21) Appl. No.: 12/925,918

(22) Filed: Nov. 1, 2010

(65) Prior Publication Data
US 2012/0106719 A1  May 3, 2012

(51) Int. Cl.
*H04M 11/00* (2006.01)

(52) U.S. Cl.
USPC ........................................ 379/93.01; 379/188

(58) Field of Classification Search
USPC ............ 379/188, 201, 93.07, 220.01, 211.02, 379/211.04, 212.01, 208.01, 210.03
See application file for complete search history.

(56) References Cited

U.S. PATENT DOCUMENTS

| | | | |
|---|---|---|---|
| 5,752,191 A * | 5/1998 | Fuller et al. | 455/445 |
| 6,393,117 B1 * | 5/2002 | Trell | 379/207.1 |
| 6,453,164 B1 * | 9/2002 | Fuller et al. | 455/445 |
| 6,701,231 B1 * | 3/2004 | Borugian | 701/29.2 |
| 7,013,132 B2 | 3/2006 | Kehr | |
| 7,944,870 B2 * | 5/2011 | Varland | 370/313 |
| 8,095,882 B2 * | 1/2012 | Kashi | 379/93.07 |
| 2003/0147519 A1 * | 8/2003 | Jain et al. | 379/211.02 |
| 2004/0101123 A1 * | 5/2004 | Garcia | 379/220.01 |
| 2006/0072726 A1 * | 4/2006 | Klein et al. | 379/201.01 |
| 2007/0155435 A1 * | 7/2007 | Billmaier et al. | 455/565 |
| 2009/0262918 A1 | 10/2009 | Nakanishi et al. | |
| 2010/0054444 A1 * | 3/2010 | Brunson | 379/211.02 |

* cited by examiner

*Primary Examiner* — Maria El-Zoobi

(57) ABSTRACT

This application relates to providing an end user control of temporary numbers established and linked to a trusted phone number using traditional forwarding mechanisms. Temporary phone numbers can be created and assigned to individuals to provide them with a unique point of contact. The temporary numbers are then linked to the individual's private number. The temporary numbers can be shared with individuals and organizations with whom the individual has an interest in communicating with. However, these numbers will often find their way into the hands of third parties with whom the individual has no interest in talking with. When the user simply no longer feels that the numbers are being properly used, the user can remove the temporary numbers linked with their private number so no further calls can be made and routed to their private number. The temporary numbers can be used to uniquely identify the calling party.

20 Claims, 6 Drawing Sheets

SYSTEM FOR ESTABLISHING PUBLICLY ACCESSIBLE TELEPHONE NUMBERS AND METHODS THEREOF

TECHNICAL FIELD

This application generally relates to communication networks, and more particularly, to providing at least one temporary contact established for public availability in an untrusted domain which is linked to their trusted private contact, the temporary contact in one method used for identifying a caller.

BACKGROUND

In public switched telephone networks, users begin by dialing a phone number when attempting to establish communication with another party. The called number is passed to a call processing function in the telephone network. The processing function determines which phone is associated with the called number and how to alert it. The called phone is then signaled, as necessary, of the incoming call. The called party is then alerted who can answer the call.

Today, if unwanted calls are being received, there are few options available to the user to correct the problem. Incumbent local exchange carriers and competitive local exchange carriers offer the ability to change a number for a fee, but this incurs considerable overhead on the part of the user. All trusted contacts must be notified, including family and friends, government organizations, employment, etc. This introduces the strong likelihood that one or more desired contacts will be missed and will be unable to contact the user.

System and device features are known which allow certain numbers identified by the user to be blocked on the basis of the caller's number, usually after an unwanted call has been received. This, however, does not prevent a caller from contacting the user from another number, or by blocking their caller ID. Typically for this option to be effective, the user must resort to blocking all anonymous calls and constantly react to any other unwanted calls by updating their blocked list. Some service providers already offer features that block anonymous calls automatically. In such cases, the calls are simply not allowed to be completed.

With respect to telemarketer calls, "Do Not Call" lists address a part of the problem using the force of law rather than technology. Unfortunately, a user's entry in the list can expire periodically, and the laws governing these lists provide exemptions for certain classes of telemarketer's.

As virtually all users have been impacted by unwanted callers at one point or another, they are often reluctant to divulge their private contact information, even when it can be logical to do so. For example, a user may not want to give out their home telephone phone number when applying for a credit card application, for fear it can fall into the hands of telemarketers, yet it can be a prerequisite of the application itself. Unfortunately there is no current method to prevent unwanted callers from reaching someone once they have their number. The most effective solution involves requesting a new phone number and broadcasting it to trusted individuals. A need therefore exists for a system and method that allows a user to be contacted on a telephone number of choice without having to give out their private number.

In a related disadvantage, telephone networks can provide caller identification that indicates information about the originator of the call. This information can often be misleading, as the originating name and number may not reflect exactly who is calling. For example, the name or number could represent a business, not an individual. The name or number can represent the owner of the phone, such as a parent, which may not be the person making the call. Moreover, caller identification can be spoofed to present false information, or be concealed all together.

It is standard practice to have contact lists stored in phones. The names associated with these contacts often override the originators calling line id. However, the association is still done using the originators number to lookup the entry in the contact list. If the number is not in the contact list, or the calling number information is concealed, name resolution from the list of contacts is prevented. Furthermore, if the originating number is used by several individuals, for example family or business, it is impossible to know for certain who is calling until the call is answered. Employed by businesses, another practice for identifying a caller is to first answer the call and have the caller enter a unique piece of information, such as account number. The information is then used to uniquely identify the caller. This is a two step process, and requires the call to be answered first potentially incurring costs on the caller.

The present application addresses the above-described issues encountered in caller identification through use of the established temporary numbers described herein as well as other related advantages.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

DESCRIPTION OF THE APPLICATION

The description set forth below in connection with the appended drawings is intended as a description of presently-preferred embodiments of the application and is not intended to represent the only forms in which the present application can be constructed and/or utilized. The description sets forth the functions and the sequence of steps for constructing and operating the application in connection with the illustrated embodiments. It is to be understood, however, that the same or equivalent functions and sequences can be accomplished by different embodiments that are also intended to be encompassed within the spirit and scope of this application.

Generally described, the present application relates to providing an end user control of temporary numbers established and linked to a trusted phone number using traditional forwarding mechanisms. The temporary numbers can be established in most platforms including incumbent local exchange carriers (ILECSs), competitive local exchange carriers (CLECs) and enterprise and small business (SMB) platforms, to name a few. In one illustrative embodiment, temporary phone numbers can be created and assigned to individuals to provide them with a unique point of contact. The temporary numbers are then linked to the individual's private number.

The temporary numbers can be shared with individuals and organizations with whom the individual has an interest in communicating with. Inevitably, however, these numbers will find their way into the hands of third parties with whom the individual has no interest in talking. When the user simply no longer feels that the numbers are being properly used, the user can simply remove the temporary numbers linked with their private number so no further calls can be made and routed to their private number. This provides the individual with the ability to prevent unwanted calls and protect a permanent contact point for desired callers.

In a related embodiment, the temporary numbers can be used to uniquely identify the calling party. Information can be determined about the caller from the temporary number called. In this embodiment, the name or number of the line the calling party is making the call from is not used to identify the calling party as this can provide misleading information about the real identity of the caller. The originator in some instances cannot prevent, block or change this information in any manner. The caller information can be provided at the final leg of the call routing, not the initiating call leg. The information can be provided at the carrier, private branch exchange, or within the terminating device itself.

Figure 1:
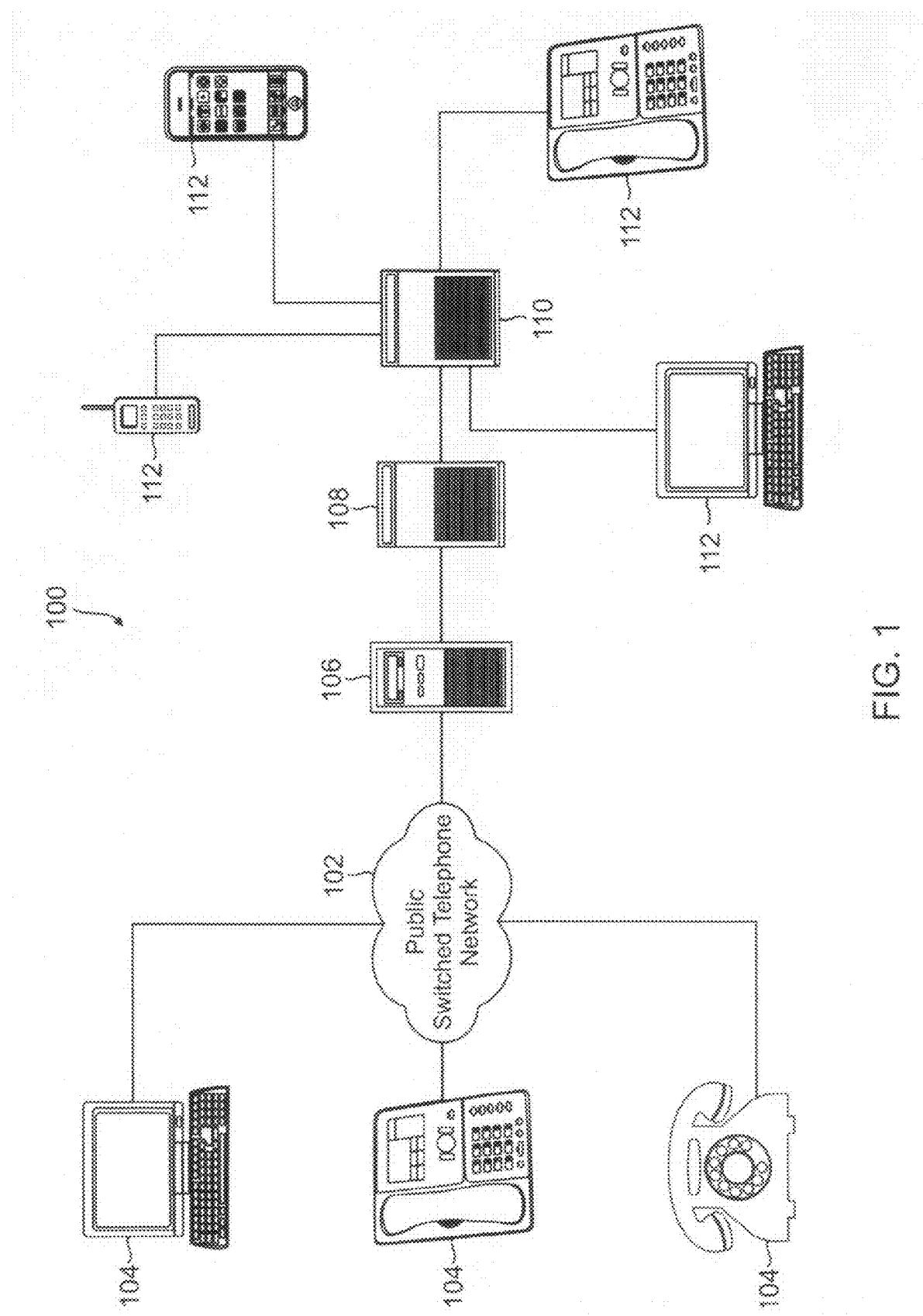
FIG. 1 is a typical phone system for establishing temporary telephone numbers in accordance with one aspect of the present application.

Turning to FIG. 1, a typical phone system 100 for establishing temporary telephone numbers in accordance with one aspect of the present application is provided. Components within the phone system 100 can communicate with each other using logical connections. These logical connections can be achieved by a communication device coupled to or integral with each component of the phone system 100. In one embodiment, the phone system 100 can be provided in the form of a VoIP phone system 100. Traditionally, VoIP phone systems 100 use digitized audio. The digitized audio can be delivered in packet form and can be transmitted over intranets, extranets, and the Internet. VoIP phone systems 100 can cover computer-to-computer, computer-to-telephone, and telephone-based communications. In one embodiment, the phone system 100 can be implemented on top of a plain old telephone service.

Known to those skilled in the relevant art, numerous types of phones 104 can be used to make a call to a user of the phone system 100 described herein. Dependent on the carrier service, a computer 104, IP phone 104, telephone 104, etc. can be used to communicate with a public switched telephone network 102. The public switched telephone network 102 can handle analog as well as digital communications. Connected to the public switched telephone network 102 can be a private branch exchange 106. The private branch exchange 106 can provide functions for switching voice calls from the public switched telephone network 102.

The private branch exchange 106 can be coupled to a voice gateway 108, which can feed into a communications facility 110. The communications facility 110 can then interact with a user's phone 112. The communications facility 110 can include a base station for wireless devices such as a mobile phone 112 or smart phone 112. The communication facility 110 can also provide landline services for the IP phone 112, computer 112, etc.

FIG. 1 represents components illustrative of a typical phone system 100 for allowing establishment of temporary telephone numbers. These components should not be construed as limiting the scope of the present application, but instead, the phone system 100 should be viewed as only one type of system that can be used.

For purposes of illustration, a flow chart will now be provided showing operations for setting up the temporary numbers. This flow chart is given so that a general understanding of this application can be appreciated by those skilled in the relevant art. It should not be construed as limiting to the present application. The flow chart showing the setup processes are then followed by block diagrams representing relationships established between the temporary numbers and private number.

Figure 2:
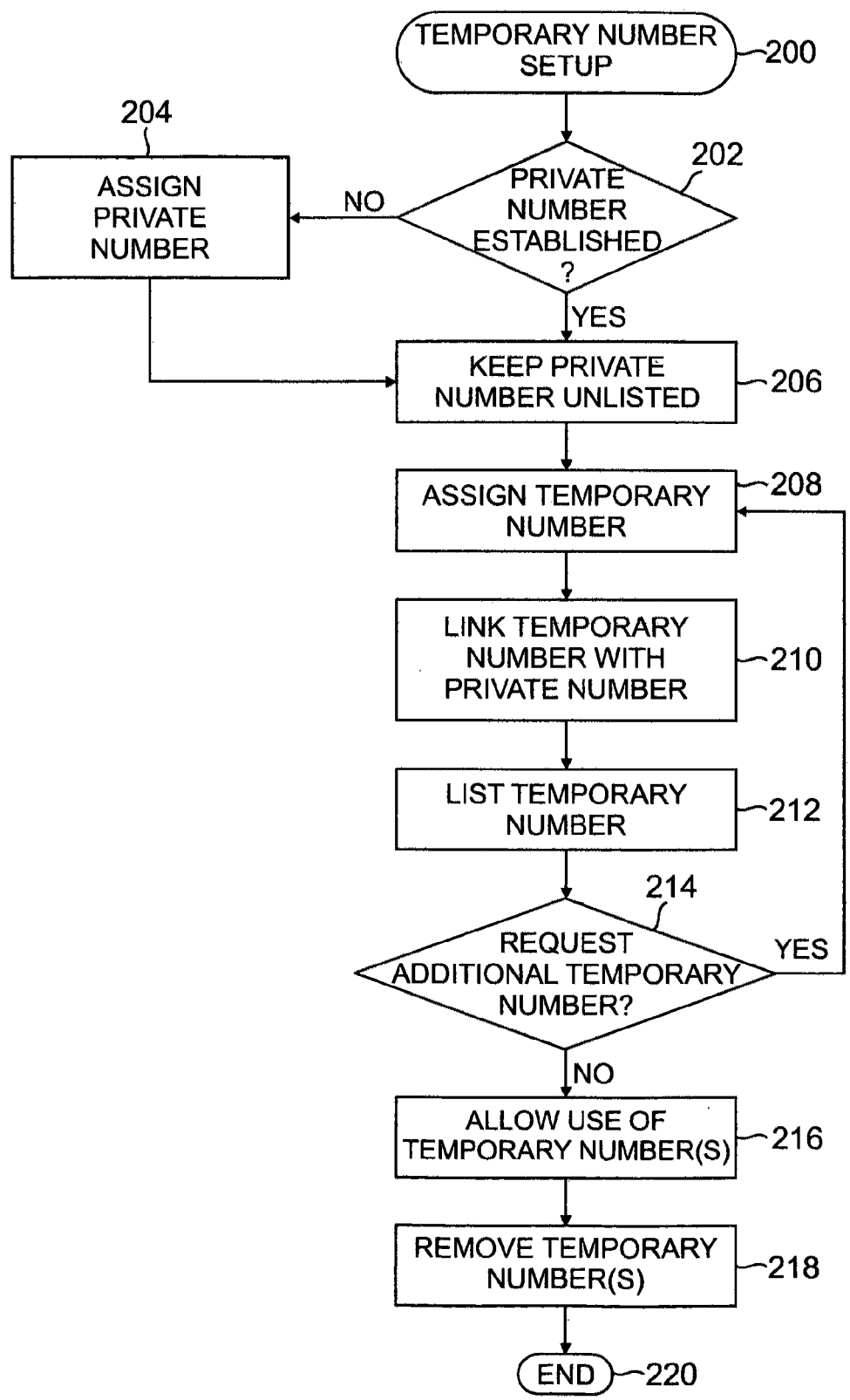
FIG. 2 is a flow chart providing illustrative processes for setting up the temporary numbers in accordance with one aspect of the present application.

FIG. 2 is a flow chart providing illustrative processes for setting up the temporary numbers in accordance with one aspect of the present application. While the processes are generally described as taking place in a private branch exchange 106, those skilled in the relevant art will appreciate that the temporary numbers can be setup in other components of the phone system 100, even in components that have not been shown. By setting up these temporary numbers, the user's phone 112 can be called using more than one number. Temporary numbers can be easily assigned and later, de-assigned by the user. These temporary numbers can be listed as a directory number for the user while the user's private number would be unlisted.

At block 200 of the flow chart, the processes for setting up temporary numbers for a user can begin. At decision block 202, the phone system 100 determines whether a private number has been established so that the private number can be used with at least one temporary number. The private number can refer to a user's home phone 112. In one embodiment, the number can refer to a cellular phone 112 of the user or the like.

After the phone system 100 establishes that no private number exists for the user, the user can be assigned a private number at block 204. In this embodiment, the user can be assigned a temporary number as well as a private number in a single system. Alternatively, when a private number has already been established for the user, at block 206, the private number of the user can be maintained in privacy allowing only those users who are in a trusted domain to access it. In one embodiment, this means that the private number can be kept unlisted.

At block 208, temporary numbers can be assigned to the user. This can be best accomplished by the service provider providing a range of numbers classified as temporary or untrusted. Typically, this can be performed by an administrator of the private branch exchange 106 shown in FIG. 1. On local exchange carriers, such as ILECSs, CLECs and enterprise and SMB platforms, call centers can be established to setup these temporary numbers. The usage of a block or unique range of numbers can simplify call routing, call restrictions, policy classification, and recycling of numbers, for example, 1-800 numbers or 1-866 numbers. The user can be granted control to manage their numbers.

Temporary numbers are not limited to traditional three number area codes followed by seven digit local numbers. Numerous types of telephone numbers can be setup. Many systems allow calls within a local area to be made without dialing the local area code. For example, a phone number in North America will start with three numbers (such as 918), which is the area code, followed by seven digits split into sections of three and four (such as 555-1212), which is the local number.

Private Numbers and temporary numbers can be assigned from two distinct number ranges. For example, in a private branch exchange 106, private numbers can be 4-digit numbers and temporary numbers can be 5-digit numbers. At a central office where telephone numbers must contain a predetermined number of digits, the temporary numbers can be in the range "*-555-**" where "*" represents a dialable digit. Private numbers, in this embodiment, would not typically be in this range.

At block 210, the temporary numbers can be linked with the user's private number. As will be shown below, a number of forwarding mechanisms can be used to link them together. For example, Call Forwarding can be used to link the temporary number to the private number. Traditional call routing services can also be used. The temporary number can then be listed at block 212. In one embodiment, the temporary number can be provided by the user to those who are in an untrusted domain such as in an advertisement or service application. In addition, the temporary number can be listed as a user's public directory number.

The phone system 100, at decision block 214, can determine whether any additional temporary numbers have been requested by the user. While one temporary number was linked with the user's private number above, those skilled in the relevant art will appreciate that the user can obtain numerous temporary numbers for a variety of reasons. For example, temporary numbers can be established based on the longevity of use. The user can setup some temporary numbers that they know will be used only for a week, while other numbers can be made for a month long.

When additional temporary numbers have been requested by the user, the phone system 100 can return to block 208 where additional temporary numbers can be established. At block 216, after establishment of the private and temporary numbers, the phone system 100 allows use of the number whereby the temporary number can be dialed to reach a user's private number without the calling party's knowledge.

At block 218, the temporary numbers can be removed. In one embodiment, the temporary numbers are removed when the user makes this request to an administrator or some other personnel. The temporary numbers can also be removed after a period of time expires. The processes can end at block 220. Known to those skilled in the relevant art, interfaces can be provided to let the end user have control.

The establishment of temporary numbers along with the removal of them, as shown in FIG. 2, can cause an issue at the service provider with consumption and reallocation of the temporary numbers. In one embodiment, this can be resolved using an entirely separate range, and an algorithm to recycle numbers to make sure the temporary numbers are unused for as long as possible. For example, with a 4-digit extension, a separate bank of 6-digit numbers can be created starting with "7" that can allow 99999 temporary numbers. Because the number is simply translated to a 4-digit extension, the system 100 is generally not using up any extra 4-digit directory numbers, but instead just a range of invalid directory numbers. Furthermore, the use of a separate numbering range limits the ability of a caller to begin guessing valid extensions within the company, and provides regional anonymity at the public switched telephone network level. This implementation can allow internal network dialing with no dialing conflicts. The internal network can be for trusted devices and in one embodiment, incorporates 4-digit extensions. For example, the system 100 does not need to worry about private directory number 7000 being confused with public directory number 700000 whereby a 6-digit dialing number is only valid at ingress/egress of the system 100 assuming that a PBX is used.

Figure 3:
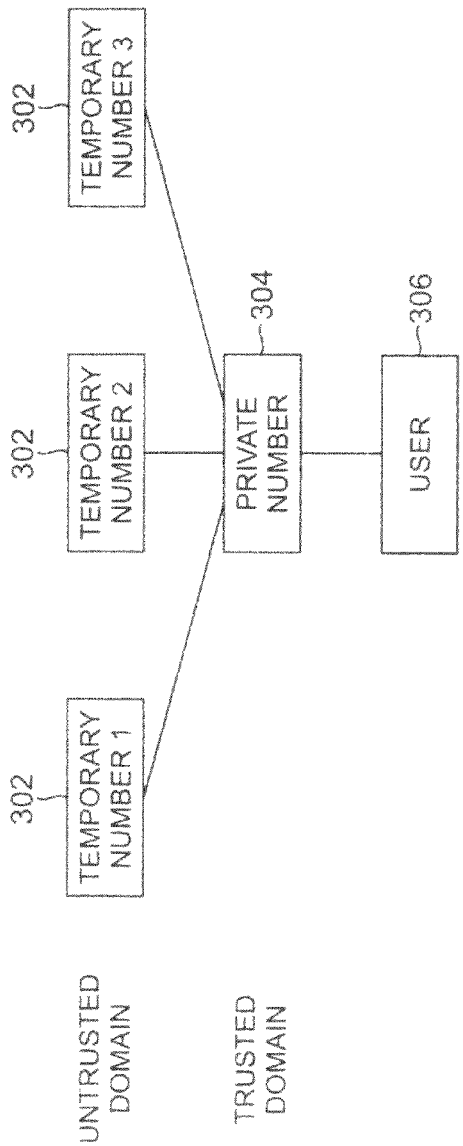
FIG. 3 is a block diagram showing a typical relationship between temporary numbers and a private number of a user in accordance with one aspect of the present application.

FIG. 3 provides a block diagram showing a typical relationship between temporary numbers 302 and a private number 304 of a user 306 in accordance with one aspect of the present application. The phone system 100, described above, can allow the user 306 to change their publically advertised number, which is accessible to untrusted callers, without impacting trusted callers. In one embodiment, trusted callers can include family, friends, co-workers, and other individuals who have been specifically granted permission to call the user 306 using private number 304, either by willingly providing the phone number, or via an internal corporate directory, etc. An untrusted caller can be someone who obtains the user's number from a public directory. In one embodiment, the temporary number may have been provided to the untrusted caller for temporary contact purposes.

In one example of use, a user 306 can give out their temporary number 302 to a customer service representative. This number 302 can be direct and externally accessible so that someone can call the user 306 back without the hassle of going through the whole automated system, and landing on the wrong representative. However, giving out this number 302 could result in it falling into the hands of the general public such that the user 306 can be contacted by anyone, anytime.

The multiple temporary numbers 302 can represent individual clients, or a single number could be used if client differentiation is not required. The user 306 can change their temporary numbers 302 on demand and the number 302 would no longer be in service if it is not linked to a private number 304. One skilled in the relevant art would appreciate that temporary numbers 302 can be assigned and removed through a number of different methods. For example, feature access codes, phone buttons and user configurations can all be used to perform these processes.

In one embodiment, users 306 who obtain the service, whether by purchasing it, or mandated by their employment, etc., can be given a temporary public number 302 that they can advertise to untrusted sources. This number can be linked via configuration programming to the individual's trusted or private number 304. The user 306 can request to change their temporary number 302 at will, or request additional temporary numbers if required. Typically, this can be performed by calling the service provider, by feature access code, internet account access, or other means. As provided earlier, the user can be granted control to manage their numbers. Interfaces can also be provided to let the end user have control.

Figure 4:
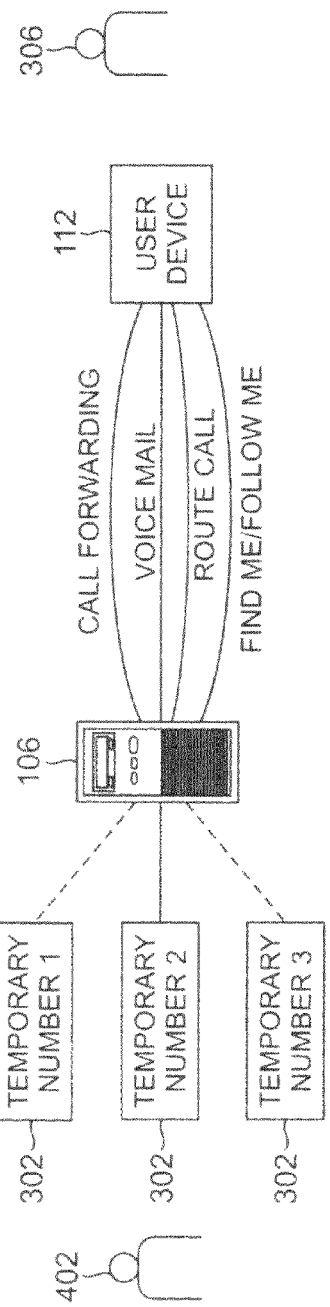
FIG. 4 is a block diagram depicting exemplary features of the branch exchange in accordance with one aspect of the present application.

With reference now to FIG. 4, a block diagram depicting exemplary features of the branch exchange 106 in accordance with one aspect of the present application is provided. Numerous callers 402 can be provided with the opportunity to call the user 306 through temporary numbers 302 depicted as Temporary Number 1 302, Temporary Number 2 302, and Temporary Number 3 302. Typically, these callers 402 are in an untrusted domain.

While the number of components has been reduced within the phone system 100 to establish a connection between the caller 402 and the user 306, those skilled in the relevant art will appreciate that these components can be provided therein. At the private branch exchange 106, the phone system 100 can determine which private number 304 is associated with a temporary number 302 called. As shown before, the private number 304 can be linked with one or many temporary numbers 302. For example, the private number 304 can be associated with Temporary Number 1 302, Temporary Number 2 302, and Temporary Number 3 302.

In one embodiment, the private branch exchange 106 simply routes the call from the caller 402 using the temporary number 302 to private number 304 link to reach the user 306 at their device 112. The private branch exchange 106 can also route calls to the user device 112 through Call Forwarding or Find Me/Follow Me techniques. In such features, a user 306 can be reached at one of a number of devices 112 of their choice and unknown to the caller 402 who dials a temporary number 302. The private branch exchange 106 can also handle voicemails. It would be evident that in making this adaptation, calls to temporary numbers 302 and private numbers 304 can be either treated the same way, or in different ways from each other.

While described primarily as handling telephone calls, the phone system 100 can also handle other types of communications where a caller 402 would dial a temporary number 302 to reach a private number 304 of a user 306. For example, the caller 402 can use the temporary number 302 to send an email, text message, voicemail, and faxes.

Figure 5:
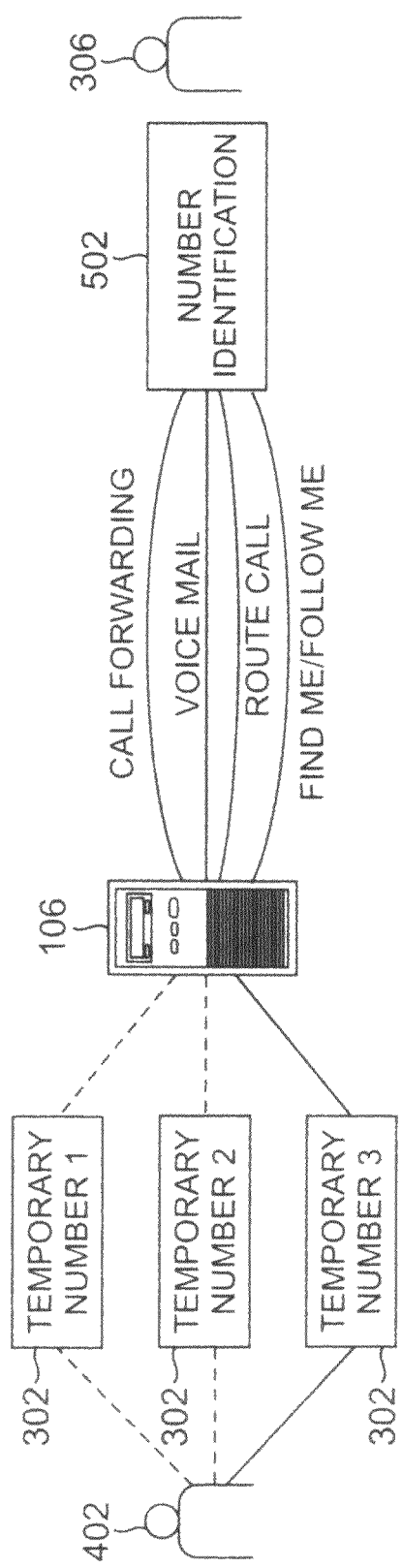
FIG. 5 is a block diagram representing illustrative caller identification processes in accordance with one aspect of the present application.

In one embodiment, the temporary numbers 302 established above can be used for reverse caller identification. Turning now to FIG. 5, a block diagram representing illustrative caller identification processes in accordance with one aspect of the present application is provided. The caller identification feature can be built on top of the untrusted/trusted domain, which provides a method for the owner of a private number 304 to create temporary numbers 302. The temporary numbers 302 can be removed and new ones added over time as the user 306 requires. The temporary numbers 302 are capable of being cancelled without impacting others who have also been given a temporary numbers 302 to contact the user 306.

As shown in FIG. 5, Temporary Number 1 302, Temporary Number 2 302 and Temporary Number 3 302 can be established by the called party 306 through those processes described above. Known to those skilled in the relevant art, fewer or more temporary numbers 302 can be used. The temporary numbers 302, when called, can be connected with the private branch exchange 106. The private branch exchange 106 can route the call from the caller 402 using the temporary number 302 to the private number 304. The private branch exchange 106 can also route calls to the called party 306 through Call Forwarding or Find Me/Follow Me techniques. The private branch exchange 106 can also handle voicemails.

The caller identification feature can allow the called party 306 to determine a name or other identifier of the caller 402. In one embodiment, this information can be presented on a number identification program 502 associated with the called party 306. Through the number identification program 502, the called party 306 can determine, via the number 302 dialed, the nature of the call or who is calling. The phone system 100 can provide the temporary number 302 dialed, the name of the caller 402, or other relevant information.

In one illustration of the reverse caller identification feature provided above, a lawyer representing a client can issue a temporary number 302 to them. During the creation of this temporary number 302, the client's name and identifier can be entered for the number 302. When the client calls, the lawyer can identify the client because of the number 302 the client called, not where they are calling from. The client could call from home, from a cell phone, from jail, or from work, all of which have different caller identifications. Nonetheless, the number 302 the client is calling to reach the lawyer is unique. In one embodiment, immediate billing of the client's account can be processed when a call is received.

The information associated with the temporary number 302 can be limited to standard calling line identification restrictions with respect to the number of characters i.e. size of information. The information can also contain identification information to enable CTI applications to access database records or other information associated with the called number 302. Configuration options can exist to enable displaying called party information, suppress called party information, or provide both. VoIP environments can support updating displays in real time, not necessarily on connect state only. When the called party 306 is dialed, the PBX 106 or carrier can provide the information, based on configuration, in place of the calling line information. The temporary number 302 can be identified to the called party 306 at the number identification program 502.

Figure 6:
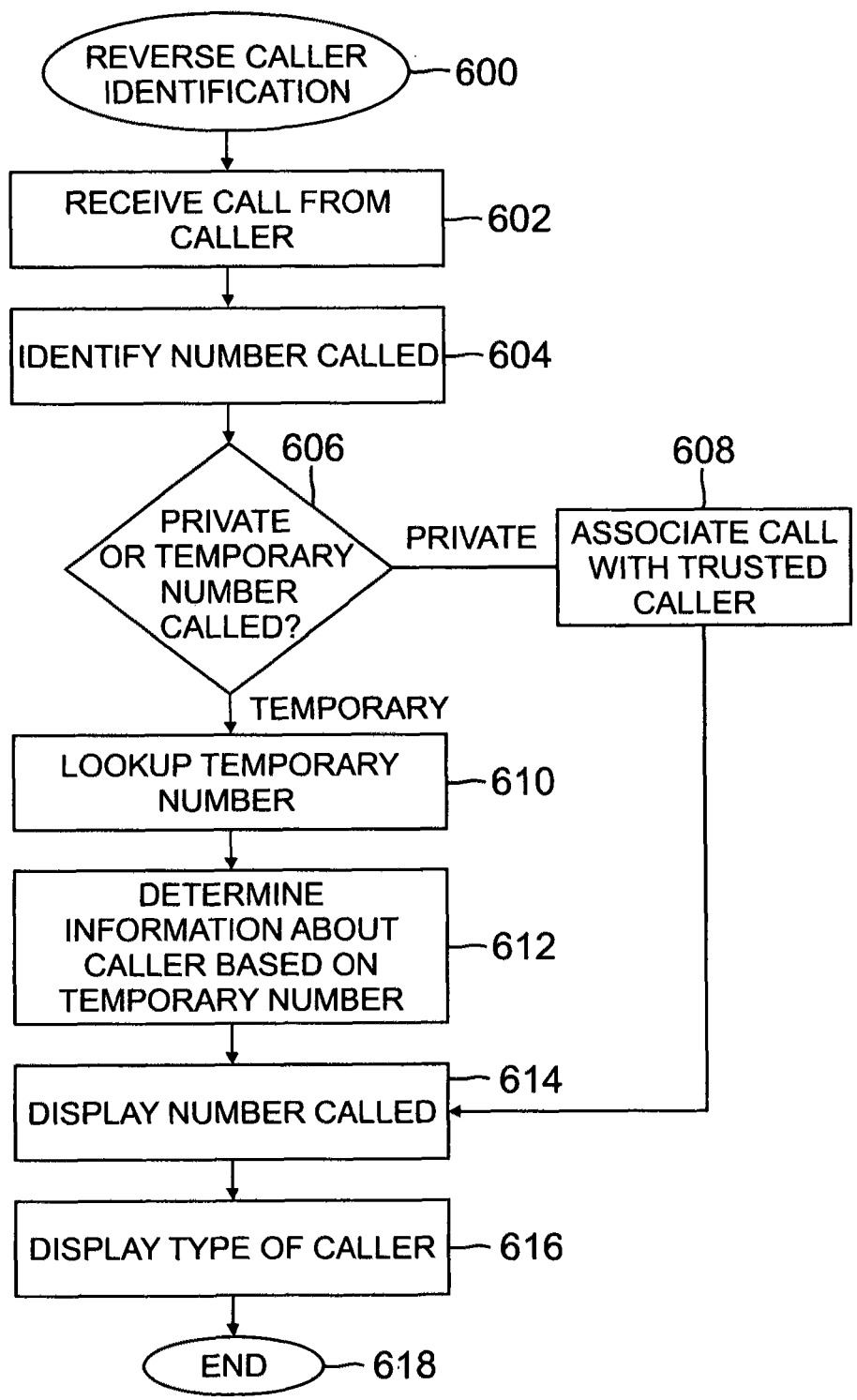
FIG. 6 is a flow chart providing exemplary processes for reverse caller identification in accordance with one aspect of the present application.

FIG. 6 is a flow chart providing exemplary processes for reverse caller identification in accordance with one aspect of the present application. While the processes are generally described as taking place in a private branch exchange 106, those skilled in the relevant art will appreciate that identifying a caller 402 can be determined in other components of the phone system 100, even in components that have not been shown. The processes can begin at block 600.

At block 602, and in accordance with one embodiment, the phone system 100 can receive a call from the caller 402. The call can be placed to the temporary number 302 established according to the description provided above. The caller 402 typically does not know that the number 302 they dialed has been temporarily established, rather the caller 402 believes that they are calling the direct line of the called party 306. At block 604, the temporary number 302 called can be identified, for example, Temporary Number 3 302 provided in the previous illustration.

At decision block 606, the phone system 100 can determine whether a private number 304 or temporary number 302 has been called. When the call was made to the private number 304, at block 608, the call can be associated with a trusted caller. The called party 306 typically provides their private number 304 to those who they intend to keep in touch with. The processes can proceed to block 614, which will be discussed below.

When the caller 402 calls a temporary number 302, the phone system 100, at block 610, can perform a lookup of the temporary number 302 that received the call. At block 612, the phone system 100 can determine information about the caller 402 based on the temporary number 302 dialed. From the previous illustration provided above, Temporary Number 3 could indicate to the system 100 that the caller 402 is associated with a certain case for the lawyer.

At block 614, the phone system 100 can provide the number identification program 502 associated with the called party 306 the number called by the caller 402 where it can be displayed. The number can be a private number 304 meaning that the call is associated with a trusted party. Alternatively, the caller 402 could have dialed a temporary number 302, which can also be displayed. At block 616, the type of caller 402 can be displayed dependent on the number called. When a private number 304 was called, the number identification program 502 can indicate to the called party 306 that the caller 402 is trusted. In the alternative, the number identification program 502 can provide information dependent on the dialed temporary number 302 determined at block 612. In one embodiment, the type of caller can be determined by the number identification program 502 and not within the private branch exchange 106 or carrier. The processes can end at block 618.

Figure 7:
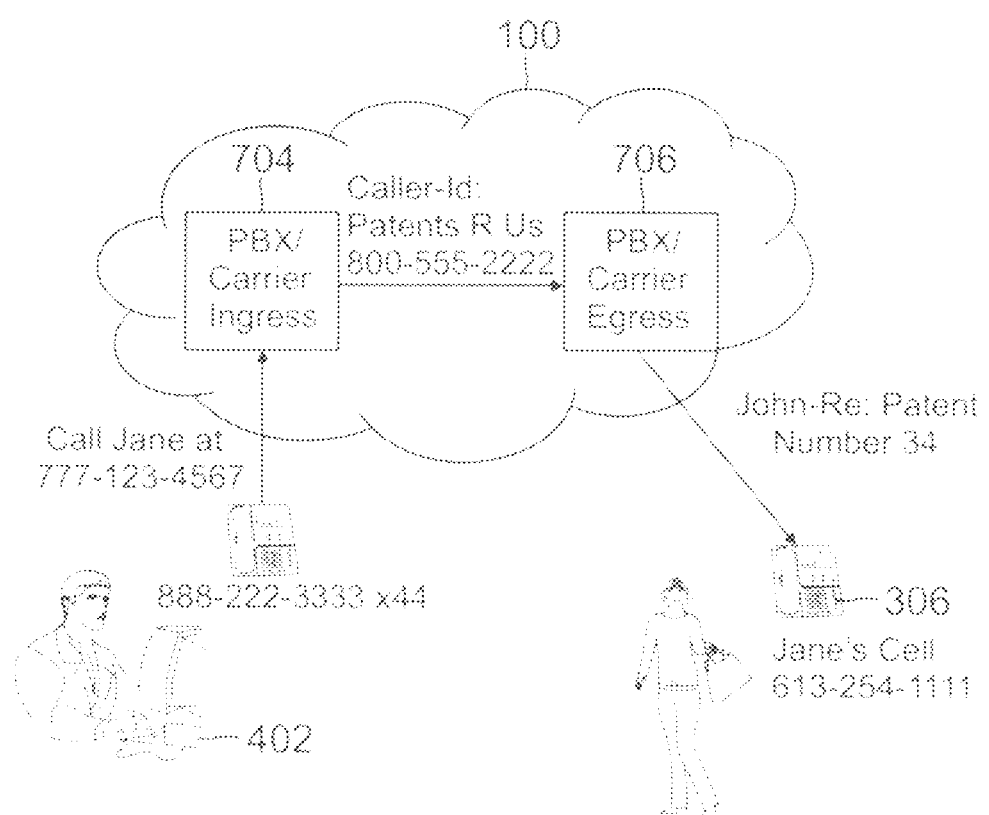
FIG. 7 is a diagram representing typical caller identification processes using established temporary numbers in accordance with one aspect of the present application.

FIG. 7 is a diagram representing typical caller identification processes using established temporary numbers 302 in accordance with one aspect of the present application. Those skilled in the relevant art will appreciate that there can be different configurations used. In this embodiment, John can call the number Jane provided to him. As shown, John calls 777-123-4567 from his number 888-222-3333 x44. Jane can establish many temporary numbers 302 that map to her private number 304 of 613-254-1111. The temporary numbers 302 can be associated with different projects that she is currently working on. For example, Jane can be working on several different patents using a number of different firms. Each patent can be assigned a unique temporary number 302.

John and Jane can communicate through the phone system 100. The system 100, as previously described, can include a private branch exchange 106 or other carrier. The exchange 106, in one embodiment, can include a private branch exchange/carrier ingress 704 and a private branch exchange/carrier egress 706. Upon dialing the phone system 100, the corporate caller identification for John can be received by the private branch exchange/carrier ingress 704. In this example, John's calling number is 800-555-2222. The number can be associated with the calling name of Patents R Us.

At Jane's end, the private branch exchange/carrier egress 706 can override John's calling party information. Based on the temporary number 302 called, the information that Jane can be provided with is John—Re Patent Number 34, which can be created with the temporary number 777-123-4567. The system 100 can then alert Jane's cell phone at 613-254-1111 and display information that John is calling about Patent Number 34 as opposed to Patents R Us, which provides no indication as to the identity of the caller 402.

Those skilled in the relevant will appreciate that the reverse caller identification can be applied to automatic call distribution centers, client service operations, hospitality, etc. The system 100 has extensive uses and applications pertaining to CTI applications, since information about the caller can be retrieved without having to answer the call and request additional information. As referenced by the example provided above, client/account numbers or other database tags can be associated with the dialed number to facilitate record retrieval, billing, or call routing. This can include priority handling of calls whereby a priority value can be assigned to the called number such that it is given preference by the receiving party or software. Unique ring tones can also be applied.

In accordance with one aspect of the present application, a method for restricting access to a private number is provided. The method can include establishing at least one temporary number and linking the at least one temporary number to the private number. In addition, the method can include receiving a communication request for the at least one temporary number. The method can also include routing the communication request to the private number when received for the at least one temporary number.

In one embodiment, the method can include listing the at least one temporary number for public access. In one embodiment, the at least one temporary number can be listed in a public directory. In one embodiment, the method can include assigning the at least one private number before the at least one temporary number is established. In one embodiment, the method can include deactivating the at least one temporary number linked to the private number.

In one embodiment, the method can include receiving a communication request for the private number and routing the communication request to the private number. In one embodiment, the communication can be a fax, email, voicemail or call. In one embodiment, the method can include forwarding the communication request to a secondary number.

In one embodiment, the method can include providing the communication request to a voicemail associated with the private number. In one embodiment, the method can include forwarding the communication request to a second number using Find Me/Follow Me techniques.

In accordance with another aspect of the present application, a method for identifying a caller is provided. The method can include establishing at least one temporary number associated with a private number and receiving a call to the temporary number from the caller. In addition, the method can include determining information about the caller from the temporary number called by the caller and providing the information to the private number. The method can also include routing the call received at the temporary number to the private number.

In one embodiment, establishing the at least one temporary number associated with the private number can include allotting the at least one temporary number specifically for the caller. In one embodiment, establishing the at least one temporary number associated with the private number can include allotting the at least one temporary number specifically for one project. In one embodiment, establishing the at least one temporary number associated with the private number can include allotting the at least one temporary number specifically for one subject matter.

In one embodiment, the method can include providing the temporary number to the private number. In one embodiment, determining information about the caller using the temporary number called by the caller can include accessing a database of records associated with the at least one temporary number.

In accordance with yet another aspect of the present application, a communication device is provided. The communication device can include at least one processor and a memory operatively coupled to the processor, the memory storing program instructions that when executed by the processor, causes the processor to perform processes. The processes can include establishing a temporary number associated with a private number and receiving a call on the temporary number. In addition, the processes can include providing caller identification information to the private number dependent on the temporary number called. The process can also include directing the call to the private number and deactivating the temporary number associated with the private number.

In one embodiment, establishing the temporary number can include receiving configuration settings from a user device associated with the private number. In one embodiment, establishing the temporary number can include locating a number based on inactivity. In one embodiment, more than one temporary number can be established for said private number.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method for restricting access to a private telephone number within a range of private telephone numbers, comprising:
   establishing at least one temporary telephone number from an entirely different range of numbers than said range of private telephone numbers, wherein said range of temporary telephone numbers is greater than the range of private telephone numbers;
   linking said at least one temporary number to said private number;
   receiving a communication request for said at least one temporary number; and
   routing said communication request received for said at least one temporary number to said private number.

2. The method of claim 1, further comprising listing said at least one temporary number for public access.

3. The method of claim 2, wherein said at least one temporary number is listed in a public directory.

4. The method of claim 1, further comprising assigning said at least one private number before said at least one temporary number is established.

5. The method of claim 1, further comprising deactivating said at least one temporary number linked to said private number.

6. The method of claim 1, further comprising receiving a communication request for said private number and routing said communication request to said private number.

7. The method of claim 1, wherein said communication is a fax, email, voicemail or call.

8. The method of claim 1, further comprising forwarding said communication request to a secondary number.

9. The method of claim 1, further comprising providing said communication request to a voicemail associated with said private number.

10. The method of claim 1, further comprising forwarding said communication request to a second number using Find Me/Follow Me techniques.

11. A method for identifying a caller comprising:
    establishing at least one temporary number associated with a private number in a range of private telephone numbers, said at least one temporary telephone number being selected from an entirely different range of numbers than said range of private telephone numbers, wherein said range of temporary telephone numbers is greater than the range of private telephone numbers;
    receiving a call to said temporary number from said caller;
    determining information about said caller from said temporary number called by said caller;
    providing said information to said private number; and
    routing said call received at said temporary number to said private number.

12. The method of claim 11, wherein establishing said at least one temporary number associated with said private number comprises allotting said at least one temporary number specifically for said caller.

13. The method of claim 11, wherein establishing said at least one temporary number associated with said private number comprises allotting said at least one temporary number specifically for one project.

14. The method of claim 11, wherein establishing said at least one temporary number associated with said private number comprises allotting said at least one temporary number specifically for one subject matter.

15. The method of claim 11, further comprising providing said temporary number to said private number.

16. The method of claim 11, wherein determining information about said caller using said temporary number called by said caller comprises accessing a database of records associated with said at least one temporary number.

17. A communication device comprising:
    at least one processor; and
    a memory operatively coupled to said processor, said memory storing program instructions that when executed by said processor, causes said processor to:
    establish a temporary telephone number associated with a private telephone number in a range of private telephone numbers, said at least one temporary telephone number being selected from an entirely different range of numbers than said range of private telephone numbers, wherein said range of temporary telephone numbers is greater than the range of private telephone numbers;
    receive a call on said temporary number;
    provide caller identification information to said private number dependent on said temporary number called;
    direct said call to said private number; and
    deactivate said temporary number associated with said private number.

18. The communication device of claim 17, wherein establishing said temporary number comprises receiving configuration settings from a user device associated with said private number.

19. The communication device of claim 17, wherein establishing said temporary number comprises locating a number based on inactivity.

20. The communication device of claim 17, wherein more than one temporary number is established for said private number.

* * * * *